United States Patent [19]

Jones, Jr. et al.

[11] Patent Number: 4,617,076

[45] Date of Patent: Oct. 14, 1986

[54] GLUE APPLICATOR FOR SINGLE-FACED CORRUGATED WEB

[75] Inventors: Thomas B. Jones, Jr., Etowah, Tenn.; Willem A. Nikkel, Covington, Va.

[73] Assignee: Westvaco Corporation, New York, N.Y.

[21] Appl. No.: 651,580

[22] Filed: Sep. 17, 1984

[51] Int. Cl.⁴ ........................ B32B 31/12; B32B 31/20

[52] U.S. Cl. .................................... 156/205; 156/208; 156/210; 156/470; 156/471; 156/497; 118/248; 118/253

[58] Field of Search ............... 156/196, 199, 205, 206, 156/208, 210, 497, 285, 471, 470, 472, 473, 474; 118/224, 225, 246, 248, 250, 251, 253

[56] References Cited

U.S. PATENT DOCUMENTS

| | | | |
|---|---|---|---|
| 1,741,382 | 12/1929 | Stokes | 118/248 |
| 3,616,073 | 10/1971 | McGirr | 156/210 |
| 3,676,247 | 7/1972 | Morris et al. | 156/205 |
| 3,690,981 | 9/1972 | Di Frank et al. | 156/210 |
| 3,712,843 | 1/1973 | Gartaganis et al. | 156/499 |
| 3,864,185 | 2/1974 | Johnson et al. | 156/208 |
| 3,892,613 | 7/1975 | McDonald et al. | 156/205 |
| 4,316,755 | 2/1982 | Flaum et al. | 156/205 |

*Primary Examiner*—Caleb Weston

*Attorney, Agent, or Firm*—W. A. Marcontell; R. L. Schmalz

[57] ABSTRACT

Back pressure against a single-faced, corrugated web opposite of a flute tip glue applicator roll is provided by a transversely extending air bearing. Air bearing fluid flow is derived from an air distributor manifold that is secured for adjustable positionment relative to the web surface.

4 Claims, 5 Drawing Figures

GLUE APPLICATOR FOR SINGLE-FACED CORRUGATED WEB

BACKGROUND OF THE INVENTION

1. Field of the Invention

The present invention relates to methods and apparatus for fabricating corrugated paperboard. More particularly, the present invention relates to a method and corresponding apparatus for applying back pressure to a single-faced corrugated web while in transit over a glue applicator roll positioned for application of adhesive to the exposed flute tips of the single-faced assembly in preparation for adding a second liner web of a double-faced assembly.

2. Description of the Prior Art

In the fabrication of corrugated paperboard, a first liner web or single facing is adhesively applied to the flute tips of the corrugated medium web while the medium web is still in intimate contact with the corrugating roll surface profile. Consequently, the single-faced web may be positively pressed into intimate contact with the corrugation flute crests with a high pressure roll nip without concern for either crushing a portion of the corrugated web pattern by excessive contact pressure or omitting a flute line of adhesion because of insufficient contact pressure.

After the single-faced web is applied and the corrugated medium is stripped from the corrugated roll surface, the reverse face of the medium is no longer accessible to a corrugated backing profile in support of the medium for application of the double-facing web. Such absence of a positive backing support structure is particularly acute at the glue applicator station whereat adhesive for the double-facing web is applied to the exposed flute tips. Some pressure is required to hold the corrugated face of the continuously running, single-faced assembly firmly against the applicator roll surface to assure that sufficient adhesive is applied along the full transverse length of each passing flute tip. However, excessive pressure will crush the fluted web whereas insufficient pressure will permit skips in adhesive application.

Uncontrolled tendencies of a single-faced assembly to warp transversely represents a major source of difficulty in back pressure regulation. When a fixed dimension gap setting is used between the glue roll surface and a corresponding backing roll surface to transversely flatten a warped, single-faced board for line contact with the flute tip glue applicator roll, a line of crushed flutes often results along either the board center or along either edge.

A relatively recent prior art effort to control single-faced board back pressure at the double face glue station has been to mount a backing roll rotational axis along the approximate mid-span between two swing arms. One end of the swing arm is pivotally secured to the machine frame whereas the free ends of the arms are supported by fluid pressure. A fluid pressure control system supports substantially all of the roll weight applied against the single-faced board. Although a fluid pressure supported backing roll represents an improvement in board quality based on reduced skippage and flute crushing, significant latitude yet remains for further improvement.

It is therefore, an objective of the present invention to provide such further improvement in double-facer adhesive application.

Another objective of the present invention is to provide a method and apparatus for uniformly pressuring the exposed flute tips of a single-faced corrugated board against the adhesive applicator roll of a double-facer glue station but is also incapable of crushing the flutes with excessive pressure.

SUMMARY

These and other objects of the invention are accomplished by means of an air bearing load against the faced side of a single-faced board line opposite from the adhesive applicator roll of the double-facer glue station.

The air bearing manifold may be mounted in direct substitution of a backing roll between pivotal support arms.

No rigid structure directly contacts the board surface, there being a significant air gap between the manifold and the board surface.

BRIEF DESCRIPTION OF THE DRAWINGS

Relative to the drawing wherein like reference characters designate like or similar elements throughout the several figures of the drawings.

DESCRIPTION OF THE PREFERRED EMBODIMENTS

Figure 1:
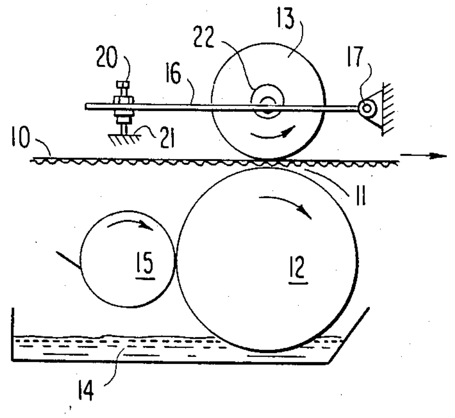
FIG. 1 PRIOR ART
FIG. 1 is an elevational schematic of a first prior art arrangement of a double-facer glue station.
Figure 2:
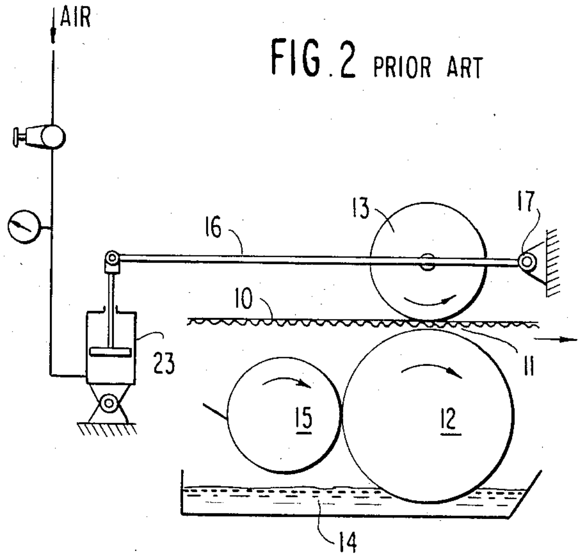
FIG. 2 PRIOR ART
FIG. 2 is an elevational schematic of a second prior art arrangement of a double-facer glue station.

The prior art illustrations of FIGS. 1 and 2 show the general invention environment where a production line of single-faced, corrugated paper board 10 is routed through a nip gap 11 between a glue applicator roll 12 and backing roll 13. In this configuration of glue station, a chordal section of the applicator roll 12 is immersed in an open pond of adhesive 14. As the applicator roll 12 rotates, the surface thereof is coated by immersion. A counter-rotating doctor roll 15 is adjusted to a fixed gap separation distance from the applicator roll surface to leave a film of adhesive on the applicator roll surface of precise thickness.

Stub axles projecting from each end of the backing roll 13 are rotatively supported by bearings secured to the mid-span of swing arms 16. One end of the swing arms 16 is pivotally mounted to the machine frame by journal 17.

The distal ends of swing arms 16 are normally secured in the manner of FIG. 1 which includes an adjustable stop screw 20 bearing on an abutment plate 21. By the stop screws 20 the gap opening of nip 11 is regulated and parallelism of the rider roll axis relative to the applicator roll is set. Backing roll bearing journal eccentrics 22 are also used by the prior art to set gap spacing and parallelism.

The FIG. 2 embodiment of the prior art provides a pressure regulated fluid strut 23 to support the swing arm distal ends. This arrangement allows any desired percentage of the suspended backing roll weight to be supported by the fluid system which maintains a constant pressure. Any external force (from the single-faced board, for example) tending to lift the backing roll 13 will decrease the support pressure in strut 23 which is immediately restored by the addition of fluid thereby increasing the opening of gap 11.

Figure 3:
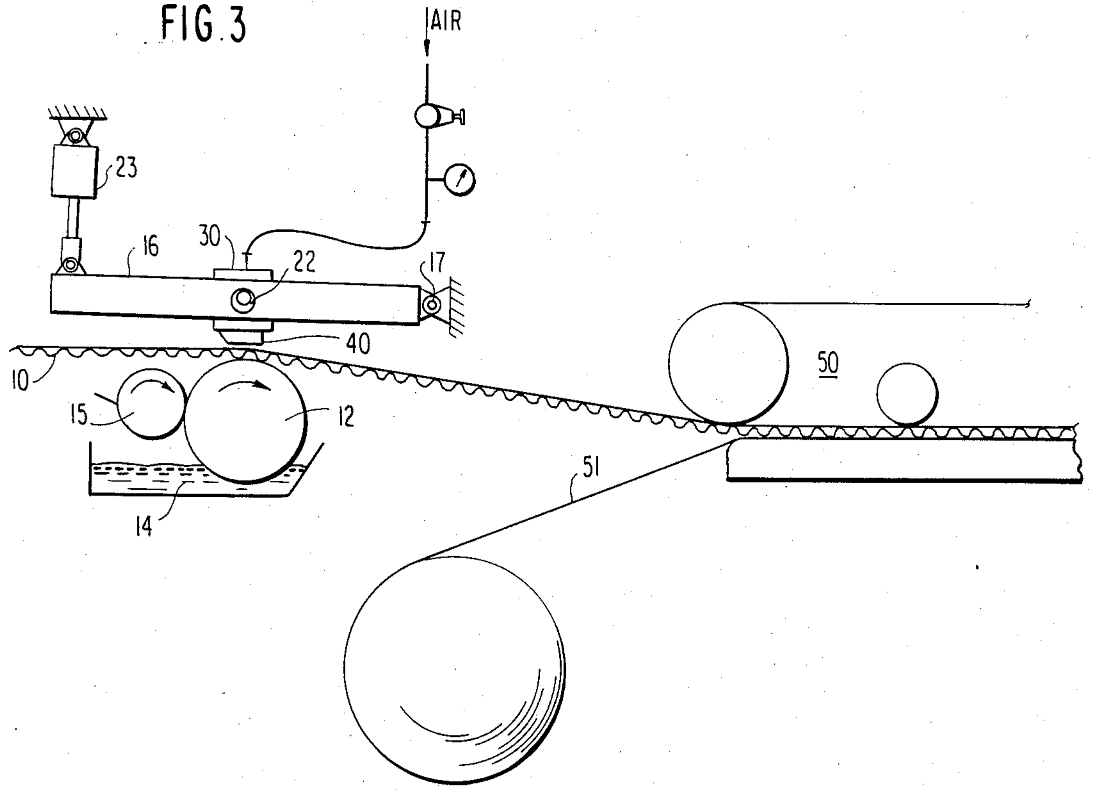
FIG. 3 is an elevational schematic of a double-facer glue station incorporating the present invention and shown in combination with a double-facer machine.

In contrast with the prior art of FIGS. 1 and 2, FIG. 3 shows the present invention to include an air distribution manifold 30 in positional substitution for a prior art backing roll. Like the backing roll, this distribution manifold 30 spans the full width of the traveling board line 10 opposite from the glue transfer roll 12. Operatively, however, the distribution manifold makes no physical contact with the board 10. Relatively low pressure air supplied from an external source is discharged from the shoe portion of manifold 30 to provide a uniformly distributed film of air pressure bearing on the top or lined face of the board line to gently and evenly press the underside flute tips against the glue roll surface. There being no structural contact, no opportunity arises for localized high pressure loads sufficient to crush the flute webs. Conversely, all transverse elements of the board line are assured adequate contact pressure with the glue applicator roll.

From the glue station, the board line 10 continues into the double-facer 50 to receive a second liner web 51 which is bonded to those exposed flute tips previously coated at the glue station.

Figure 4:
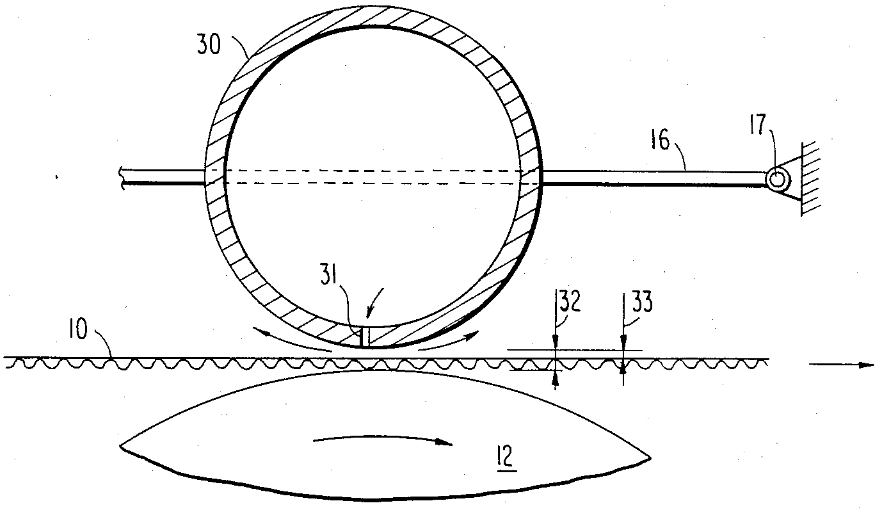
FIG. 4 is a sectional view of a first embodiment of the present invention; and, FIG. 5 is a sectional view of a second embodiment of the present invention.

Specifications of the FIG. 4 invention embodiment include an air supply, not shown, which enters the manifold at any convenient point such as either or both ends. Air discharge is from a series of orifices 31 along the manifold length adjacent the board production line 10. In a representative application, 1/16 inch diameter orifices were spaced along the 90 inch length of a 2 inch nominal diameter pipe manifold 30 at 2 inch intervals. Air pressure within the manifold 31 was maintained at 5–9 psig. This arrangement was given a 3/32 inch safety gap setting 32 between the proximate manifold 30 structure and the radial surface of application roll 12 for running a single-faced production line of B flute board having a nominal thickness of 0.110 inch. An air film 33 of approximately 0.002 inch between the board 10 liner face and the manifold 30 resulted.

Figure 5:
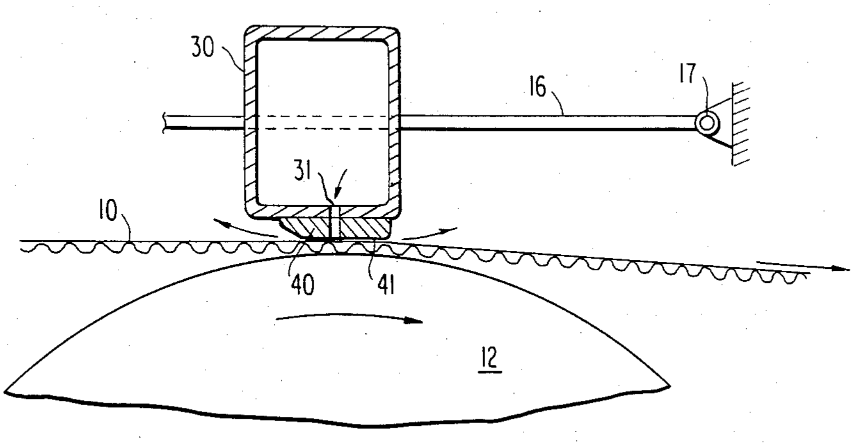

The invention configuration of FIGS. 3 and 5 comprise a wear shoe element 40 secured to the 3×4 inch rectangular manifold 30 with 1/16 inch apertures therethrough positioned to align with manifold apertures 31. The lower face 41 of the shoe element 40 is contoured to conform with a radius from the applicator roll 12 axis. Because of the larger air bearing area of this FIG. 5 configuration, the requisite air flow rate at 15 to 20 psi. is substantially less than that of the FIG. 4 embodiment.

Although the appropriate air bearing pressure will vary for different products and product weights, the range of such variation is relatively narrow. In other words, little adjustment of the air pressure and air film gap 33 is necessary for the normal production mix of board size.

An analysis of the present invention will reveal that the air bearing force against the single-faced production line is substantially constant and uniform across the board width regardless of minor warpage. However, notwithstanding warpage, the air bearing force of the invention along the critical line opposite of the applicator roll 12 is sufficient to push all flute elements against the roll carried adhesive film. Consequently a relatively heavy backing force may be applied to the board along the double-facer glue roll to assure that all flute tips receive adhesive without concern for crushing flutes by a warpage induced overload.

Having fully disclosed our invention and the preferred embodiments thereof, we claim:

1. In combination with an apparatus for continuously applying a second facing web to an exposed face plane of corrugated flute tips forming a continuously produced line of single-faced, corrugated paperboard, a glue station having an adhesive applicator roll for applying adhesive to said exposed, corrugated flute tips, said glue station including backing force means for exerting a force bias on said single-faced production line to press said exposed flute tips against said adhesive applicator roll, said backing force means comprising pivoting arm means having a pivot end and a distally separated loading end, said pivot end being secured for pivotal freedom about an axis transverse of said production line, said loading end being secured to load maintenance means for supporting a substantially constant loading force at said loading end and air bearing means secured to said pivoting arm means between ends for transverse span of said production line for sustaining a substantially uniform pressure distribution of said force bias across the width of said single-faced production line.

2. An apparatus as described by claim 1 wherein said air bearing means comprises an air distributor conduit having discharge apertures along a line opposite of said applicator roll.

3. An apparatus as described by claim 2 wherein said air distributor conduit is secured to adjustment means for regulating the distance between said conduit and said applicator roll means.

4. A method of manufacturing a laminated composite comprising a corrugated web of indefinite length having facing webs adhesively secured to corrugation flute tips respective to opposite faces of said corrugated web, said method comprising the steps of:

A. providing a longitudinally moving composite of indefininte length corrugated web having a first facing web adhesively secured to corrugation flute tips respective to a first face of said corrugated web;

B. routing the travel of said first faced composite past a rotating adhesive applicator roll and in film transfer proximity therewith for transfer of adhesive film from the surface of said applicator roll to exposed flute tips respective to a second face of said corrugated board;

C. applying an air bearing pressure against said first facing web substantially uniformly distributed across the width thereof to bias said second face flute tips against said applicator roll surface;

D. supporting reactive forces from said air bearing pressure on opposite sides of said corrugated web by substantially constant loading forces; and, E. applying a second facing web to said adhesive coated second face flute tips.

* * * * *